(12) United States Patent
Gonze et al.

(10) Patent No.: US 8,764,607 B2
(45) Date of Patent: Jul. 1, 2014

(54) FUEL TYPE BASED START-STOP CATALYST HEATING SYSTEMS

(75) Inventors: Eugene V. Gonze, Pinckney, MI (US); Halim G. Santoso, Novi, MI (US)

(73) Assignee: GM Global Technology Operations LLC

(*) Notice: Subject to any disclaimer, the term of this patent is extended or adjusted under 35 U.S.C. 154(b) by 590 days.

(21) Appl. No.: 13/039,605

(22) Filed: Mar. 3, 2011

(65) Prior Publication Data
US 2012/0225752 A1 Sep. 6, 2012

(51) Int. Cl.
*B60W 10/06* (2006.01)
*F01N 3/00* (2006.01)

(52) U.S. Cl.
USPC ............. 477/111; 477/98; 477/100; 477/107; 60/284; 60/285; 60/300; 60/303

(58) Field of Classification Search
USPC ............. 477/107, 111, 100, 98; 60/284, 300, 60/285, 303
See application file for complete search history.

(56) References Cited

U.S. PATENT DOCUMENTS

| | | |
|---|---|---|
| 5,224,335 A | 7/1993 | Yoshizaki |
| 5,319,929 A | 6/1994 | Cornelison et al. |
| 5,327,991 A | 7/1994 | Yoshida |
| 5,426,934 A | 6/1995 | Hunt et al. |
| 5,441,122 A | 8/1995 | Yoshida |
| 5,444,976 A | 8/1995 | Gonze et al. |
| 5,785,137 A | 7/1998 | Reuyl |
| 5,806,307 A | 9/1998 | Aoki et al. |
| 5,848,530 A | 12/1998 | Matsuoka et al. |
| 5,904,902 A | 5/1999 | Matuoka et al. |
| 5,950,419 A | 9/1999 | Nishimura et al. |
| 5,966,931 A | 10/1999 | Yoshizaki et al. |
| 5,979,158 A * | 11/1999 | Kaiser et al. ............... 60/274 |
| 6,151,890 A | 11/2000 | Hoshi |
| 6,253,866 B1 | 7/2001 | Kojima |
| 6,275,759 B1 * | 8/2001 | Nakajima et al. ............. 701/54 |
| 6,810,977 B2 | 11/2004 | Suzuki |
| 6,892,541 B2 | 5/2005 | Suzuki |
| 6,931,839 B2 * | 8/2005 | Foster ........................ 60/284 |
| 7,077,224 B2 | 7/2006 | Tomatsuri et al. |
| 7,213,665 B2 | 5/2007 | Yamaguchi et al. |
| 2001/0032621 A1 | 10/2001 | Kojima et al. |
| 2007/0062189 A1 | 3/2007 | Keppeler et al. |
| 2008/0270005 A1 * | 10/2008 | Tooyama ..................... 701/103 |
| 2008/0282674 A1 * | 11/2008 | Gonze et al. ................. 60/285 |
| 2009/0056430 A1 * | 3/2009 | Carr et al. ................. 73/114.54 |

OTHER PUBLICATIONS

U.S. Appl. No. 11/803,682, filed May 18, 2007, Eugene V. Gonze et al.

* cited by examiner

*Primary Examiner* — David D Le
*Assistant Examiner* — Steven B Christ

(57) ABSTRACT

A start-stop system includes a fuel type module that determines a fuel type of a fuel supplied to an engine. A threshold module determines a first threshold based on the fuel type. A temperature module estimates a temperature of a catalyst of an exhaust system of the engine. A comparison module compares the temperature to the first threshold and generates a comparison signal. A power module adjusts power to a heating circuit based on the comparison signal. The heating circuit is configured to increase temperature of the catalyst. The power module adjusts the power to the heating circuit to increase the temperature of the catalyst when the engine is shutdown. An engine control module shuts down and restarts the engine to reduce idling time of the engine.

20 Claims, 4 Drawing Sheets

FUEL TYPE BASED START-STOP CATALYST HEATING SYSTEMS

FIELD

The present disclosure relates to vehicle exhaust systems, and more particularly to thermal management systems that maintain active temperatures of exhaust components.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During a combustion cycle of an internal combustion engine (ICE), air/fuel mixtures are provided in cylinders of the ICE. The air/fuel mixtures are compressed and combusted to provide output torque. After combustion, pistons of the ICE force exhaust gases in the cylinders out through exhaust valve openings and into an exhaust system. The exhaust gases may contain oxides of nitrogen (NO.) and carbon monoxide (CO) and hydrocarbons (HCs). The exhaust gases may also include methane ($CH_4$) depending upon the type of fuel combusted. For example, $CH_4$ is produced when ethanol $C_2H_5OH$ is combusted.

An exhaust gas treatment system of the ICE may include one or more catalytic converters to reduce exhaust emissions. As an example, a four-way catalyst converter (FWC) may be used to reduce $NO_x$, CO, HCs and $CH_4$ within an exhaust system. The FWC converts $NO_x$ to nitrogen and oxygen, CO to carbon dioxide, and oxidizes HCs and $CH_4$ to produce carbon dioxide and water.

A catalytic converter typically does not prevent pass through of methane gas until heated to temperatures greater than or equal, for example, 600° C. At temperatures below 600° C., methane gas can pass through a catalytic converter without being converted. This can occur, for example, during a cold start of an engine. As a result, a catalytic converter does not function to convert methane and/or provides minimal methane emissions reduction while temperatures of the catalytic converter are less than a minimum active converting temperature for methane.

SUMMARY

This section provides a general summary of the disclosure, and is not a comprehensive disclosure of its full scope or all of its features.

A start-stop system is provided and includes a fuel type module that determines a fuel type of a fuel supplied to an engine. A threshold module determines a first threshold based on the fuel type. A temperature module estimates a temperature of a catalyst of an exhaust system of the engine. A comparison module compares the temperature to the first threshold and generates a comparison signal. A power module adjusts power to a heating circuit based on the comparison signal. The heating circuit is configured to increase temperature of the catalyst. The power module adjusts the power to the heating circuit to increase the temperature of the catalyst when the engine is shut down. An engine control module shuts down and restarts the engine to reduce idling time of the engine.

In other features, a thermal control method is provided and includes determining a fuel type of a fuel supplied to an engine of a start-stop system. A first threshold is determined based on the fuel type. A temperature of a catalyst of an exhaust system of the engine is estimated. A comparison signal is generated based on a comparison between the temperature and the first threshold. Power to a heating circuit is adjusted based on the comparison signal and when the engine is shut down. The heating circuit is configured to increase the temperature of the catalyst. The engine is shut down and restarted to reduce idling time of the engine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 a functional block diagram of an engine system incorporating a thermal management system in accordance with the present disclosure;

DETAILED DESCRIPTION

Figure 1:
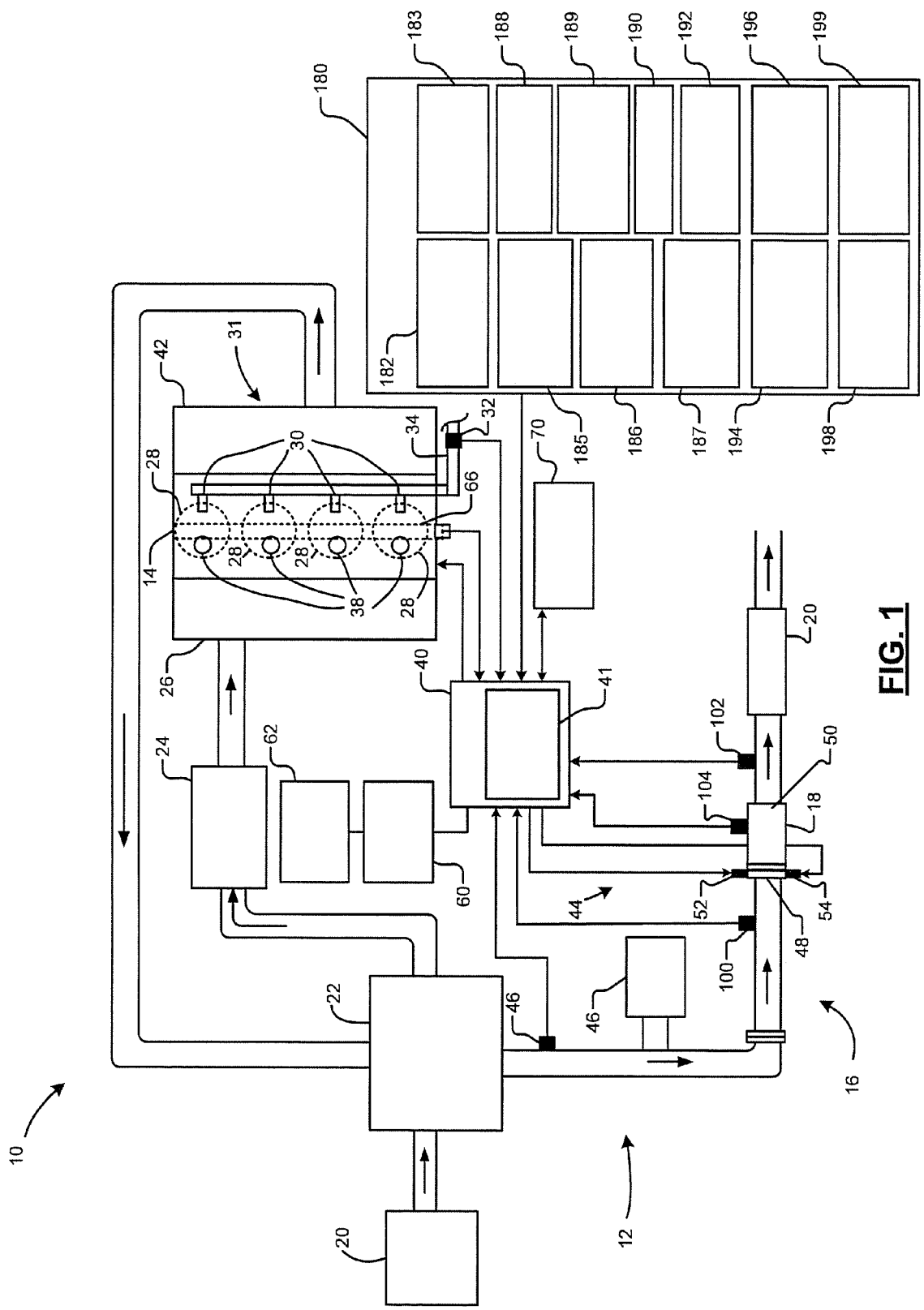

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, tasks, operations, elements, and/or components, but do not preclude the presence or addition of one or more other features, tasks, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, and/or devices, these elements, components, and/or devices should not be limited by these terms. These terms may be only used to distinguish one element, component, or device from another element, component, or device. Terms such as "first," "second," and other numerical terms when used herein do not imply a sequence or order unless clearly indicated by the context. Thus, a first element, component, or device discussed below could be termed a second element, component, or device without departing from the teachings of the example embodiments.

Figure 2:
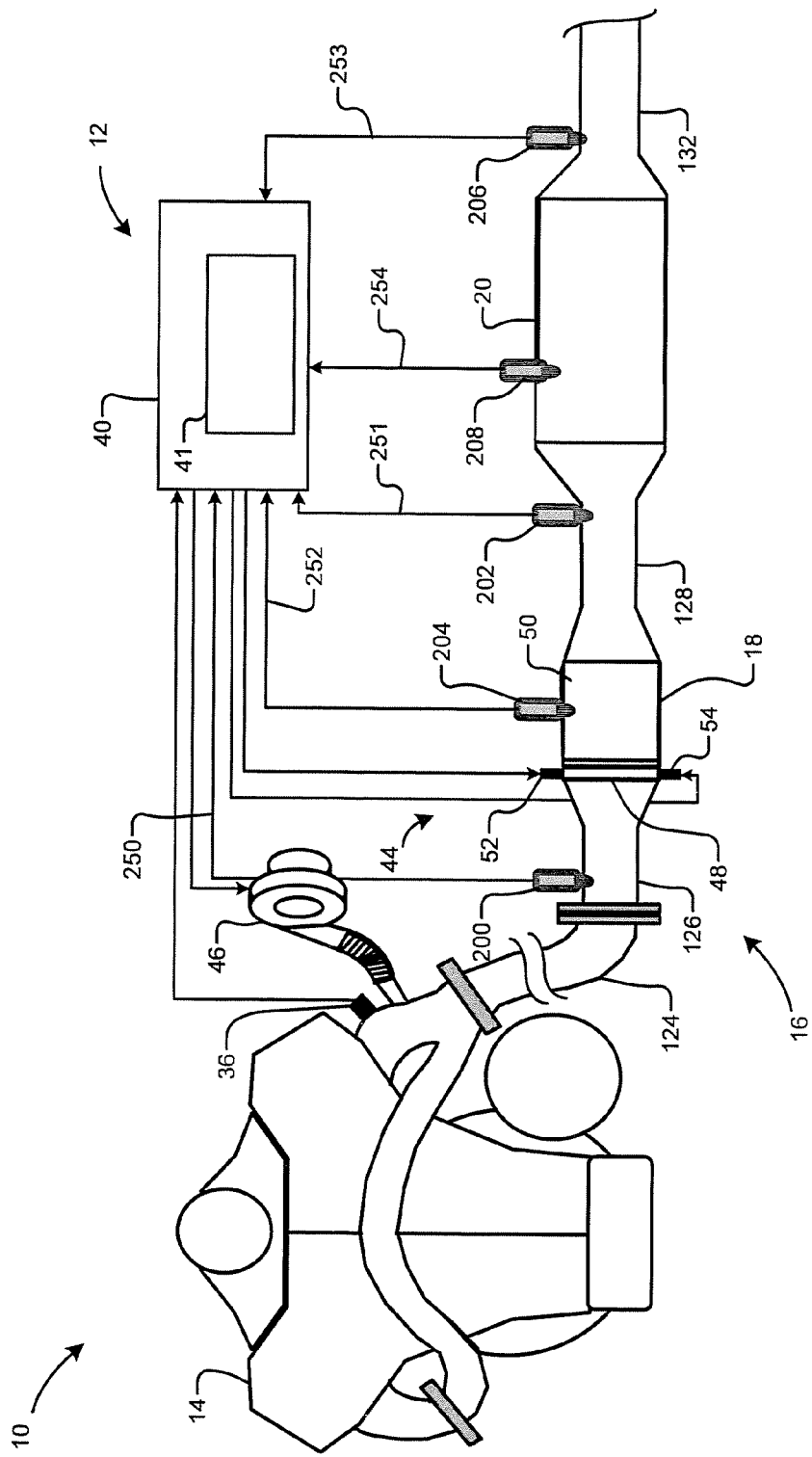
FIG. 2 is a functional block diagram of the thermal management system of FIG. 1.

In FIGS. 1 and 2, an engine system 10 and a thermal management system 12 are shown. The engine system 10 may be a hybrid electric vehicle system, a start-stop vehicle system (e.g., 12 volt start/stop system), a low emissions vehicle system, etc. A start-stop system (or stop-start) system automatically shuts down and restarts an internal combustion engine (e.g., the engine 14) to reduce the amount of time the engine spends idling, thereby improving fuel economy and reducing emissions.

The engine system 10 includes the thermal management system 12 and the engine 14 with an exhaust system 16. The exhaust system 16 includes a close-coupled four-way catalytic converter (CC FWC) 18 and an underfloor FWC 20. The thermal management system 12 increases and maintains temperature(s) of at least the CC FWC 18 above a minimum converting temperature (e.g., 600° C.) for methane and/or an active volume of the CC FWC 18 above a predetermined conversion threshold. The active volume refers to portion or volume of the CC FWC 18 that is active (i.e. at a temperature greater than the minimum converting temperature). The predetermined conversion threshold refers to an active volume at which the CC FWC 18 converts at least a predetermined percentage of methane produced by the engine.

Although the engine system 10 is shown as a spark ignition direct injection engine, the engine system 10 is provided as an example. The thermal management system 12 may be implemented on various other engine systems, such as stratified engine systems, port fuel injection systems, homogeneous charge compression ignition (HCCI) engine systems, etc. Stratified engine systems may refer to direct injection engine systems where fuel is ignited upon entering cylinders of an engine.

The engine system 10 includes the engine 14 that combusts an air and fuel (air/fuel) mixture to produce drive torque. Air enters the engine 14 by passing through an air filter 20. Air passes through the air filter 20 and may be drawn into a turbocharger 22. The turbocharger 22 when included compresses the fresh air. The greater the compression, the greater the output of the engine 14. The compressed air passes through an air cooler 24 when included before entering an intake manifold 26.

Air within the intake manifold 26 is distributed into cylinders 28. Fuel is injected into the cylinders 28 by fuel injectors 30, which are part of a fuel injection system 31. The fuel may be of various types and mixtures. The fuel types may include, for example, an alcohol-based fuel (e.g., methanol and ethanol), gasoline (petrol), or a mixture thereof, such as E85 (flex fuel). The engine 14 may receive a single type of fuel, multiple fuel types, and/or a mixture of different fuel types. For example, the fuel injection system 31 may include multiple fuel tanks (not shown); each fuel tank may have a different fuel type and/or fuel mixture. The fuel injection system 31 may selectively provide one or more of the fuel types and/or mixtures to the engine 14. The type(s) of fuel provided to the engine 14 may be detected via a fuel sensor 32 on a fuel line 34 and/or estimated based on an oxygen signal O2 from an oxygen sensor 36.

Spark plugs 38 ignite air/fuel mixtures in the cylinders 28. Combustion of the air/fuel mixtures creates exhaust. The exhaust exits the cylinders 28 into the exhaust system 16.

The thermal management system 12 includes the engine 14, the exhaust system 16, and an engine control module (ECM) 40 with a thermal control module 41. The exhaust system 16 includes the CC FWC 18, the fuel sensor 32, the oxygen sensor 36, the ECM 40, an exhaust manifold 42, a catalyst heating circuit 44, and an air pump 46. In the example shown, the exhaust system 16 includes in the following order: the exhaust manifold 42, a first exhaust conduit 124, a second exhaust conduit 126, the CC FWC 18, a third exhaust conduit 128, the underfloor FWC 20, a fourth exhaust conduit 132. The air pump 46 is connected to the exhaust manifold 42. The oxygen sensor 36 is connected to the exhaust manifold 42 upstream from the air pump 46.

As an example, the CC FWC 18 may reduce nitrogen oxides NOx and oxidize carbon monoxide (CO), unburnt hydrocarbons (HC), methane and volatile organic compounds. The CC FWC 18 oxidizes the exhaust based on a post combustion air/fuel ratio in the exhaust system 16. The amount of oxidation increases the temperature of the exhaust.

The CC FWC 18 includes an electrically heated catalyst (EHC) 48 and a non-EHC 50. The EHC 48 is actively heated via the catalyst heating circuit 44. The non-EHC 50 is passively heated through adjacent heat transfer and/or via fuel enrichment of the engine 14 and secondary air injection (SAI) into the exhaust system 16. The EHC 48 and the non-EHC 50 may refer to different portions of a single catalyst or may be distinct adjacent catalysts. For example only, the EHC 48 may have approximately 20% of the total catalyst mass of the CC FWC 18. The non-EHC 50 may have approximately 70-80% of the total catalyst mass. The non-EHC 50 may increase in temperature due to adjacent heat transfer from the EHC 48. The EHC 48 receives a selected current and/or a selected voltage from the catalyst heating circuit 44. Electrically heating the EHC 48 and not the non-EHC 50 allows for quick activation of the EHC 48 to at least the minimum converting temperature.

The catalyst heating circuit 44 includes one or more terminals. In the example shown, two terminals are provided; a supply terminal 52 and a ground or return terminal 54. In the example shown, the EHC 48 may perform as a resistive element between the terminals 52, 54 and receive current from the supply terminal 52. Temperature of the EHC 48 increases while current is supplied to the supply terminal 52. This allows the EHC 48 to increase to increase in temperature when the engine 14 is deactivated (i.e. OFF). The engine 14 is deactivated when fuel and spark (i.e. ignition system) are disabled and/or engine speed is 0. The EHC 48 may increase to at least the minimum converting temperature when the engine 14 is deactivated.

Optionally, an EGR valve (not shown) re-circulates a portion of the exhaust back into the intake manifold 26. The remainder of the exhaust is directed into the turbocharger 22 to drive a turbine. The turbine facilitates the compression of the fresh air received from the air filter 20. Exhaust flows from the turbocharger 22 to the CC FWC 18.

The thermal management system 12 and the exhaust system 16 may operate in a temperature maintaining mode, a preheat mode, a catalyst heating mode and a normal operating mode as controlled by a thermal control module 41 of the ECM 40. The temperature maintaining mode refers to maintaining temperature of at least the EHC 48 and/or the CC FWC 18 at or above the minimum converting temperature and/or maintaining an active volume of the EHC 48 and/or the CC FWC 18 at or above a predetermined conversion threshold for methane. The catalyst heating circuit 44 may be activated, maintained in an ON state, and/or cycled ON and OFF during the temperature maintaining mode. The ECM 40 controls current and voltage supplied to the terminals 52, 54 and heating time of the EHC 48 during the catalyst heating mode.

The preheat mode includes activating the catalyst heating circuit 44 to increase temperature of at least the EHC 48 while the engine 14 is deactivated. Temperature(s) of at least the EHC 48 and/or the CC FWC 18 are increased to at least the minimum converting temperature and/or until the active volume of the EHC 48 and/or CC FWC 18 is greater than or equal to a predetermined conversion threshold for methane.

The catalyst heating mode includes starting the engine 14 and heating the EHC 48, the non-EHC 50, and/or the underfloor FWC 20. The EHC 48, the non-EHC 50, and/or the underfloor FWC 20 may be heated to at least the minimum converting temperature and/or until active volumes of the EHC 48, the non-EHC 50, and/or the underfloor FWC 20 are greater than or equal to respective predetermined conversion thresholds for methane. During the catalyst heating mode the thermal control module 41 may retard spark of the engine 14, operate the engine 14 with rich air/fuel ratios and/or increase the amount of air flowing in the exhaust system 16.

A rich air/fuel ratio is a ratio that is less than a stoichiometric ratio. For example, the engine 14 may be operated at a stoichiometric ratio (e.g., 14.7:1) during a previous state and at a rich air/fuel ratio (e.g. less than 14.7:1) during a current state (or state subsequent to the previous state). During the catalyst heating mode, fuel flow to the engine 14 may be increased and/or air flow rate of the engine 14 may be decreased such that an air/fuel ratio of the engine 14 is decreased.

The thermal control module 41 may increase air flow in the exhaust system 16 by activating the air pump 46 to inject ambient air into the exhaust system 16. The ambient air is injected into the exhaust system 16 upstream from the CC FWC 18.

The normal operating mode refers to when the engine 14 is activated, the catalyst heating circuit 44 is OFF, and the EHC 48, non-EHC 50, CC FWC 18 and/or the underfloor FWC 20 are active for methane. The EHC 48, non-EHC 50, CC FWC 18 and/or the underfloor FWC 20 are active for methane when their temperatures greater than or equal to the minimum converting temperature and/or their active volumes are greater than or equal to respective predetermined converting thresholds for methane.

The engine system 10 may also include a hybrid control module (HCM) 60 and one or more electric motor(s) 62. The HCM 60 may be part of the ECM 40 or may be a stand-alone control module, as shown. The HCM 60 controls operation of the electric motor(s) 62. The electric motor(s) 62 may supplement and/or replace power output of the engine 14. The electric motor(s) 62 may be used to adjust speed of the engine 14 (i.e. rotating speed of a crankshaft 66 of the engine 14).

The ECM 40 and/or HCM 60 may control operation of the electric motor(s) 62. The electric motor(s) 62 may be connected to the engine 14 via a belt/pulley system, via a transmission, one or more clutches, and/or via other mechanical connecting devices. The electric motor(s) 62 may supplement and/or replace power output of the engine 14. The electric motor(s) 62 may be used to adjust speed of the engine 14 (i.e. rotating speed of a crankshaft 66 of the engine 14).

The ECM 40 and the thermal control module 41 may control operation of engine system 10, the thermal management system 12 and the exhaust system 16 based on sensor information. The sensor information may be obtained directly via sensors and/or indirectly via algorithms, models and/or tables stored in memory 70. Some example sensors 180 for determining exhaust flow levels, exhaust temperature levels, exhaust pressure levels, catalyst temperatures, oxygen levels, intake air flow rates, intake air pressure, intake air temperature, vehicle speed, engine speed, EGR, etc are shown. Exhaust flow sensors 182, exhaust temperature sensors 183, exhaust pressure sensors 185, catalyst temperature sensors 186, an ambient temperature sensor 187, an oxygen sensor 188, engine temperature sensor 89, an EGR sensor 190, an intake air flow sensor 192, an intake air pressure sensor 194, an intake air temperature sensor 196, vehicle speed sensor 198 and an engine speed sensor 199 are shown. The engine temperature sensor 189 may, for example, be a coolant temperature sensor and/or an oil temperature sensor.

A first exhaust flow, pressure and/or temperature sensor 200 may be connected to the second exhaust conduit 126 and upstream from the CC FWC 18. A second exhaust flow, pressure and/or temperature sensor 202 may be connected to the third exhaust conduit 128 downstream from the CC FWC 18. A first catalyst temperature sensor 204 may be connected to the CC FWC 18. A third exhaust flow, pressure and/or temperature sensor 206 may be connected to the fourth exhaust conduit 132 downstream from the underfloor FWC 20. A second catalyst temperature sensor 108 may be connected to the underfloor FWC 20. The ECM 40 and the thermal control module 41 may control operation of the thermal management system 12 and the engine 14 based on the information from the sensors 32, 36, 180, and 200-208.

Figure 3:
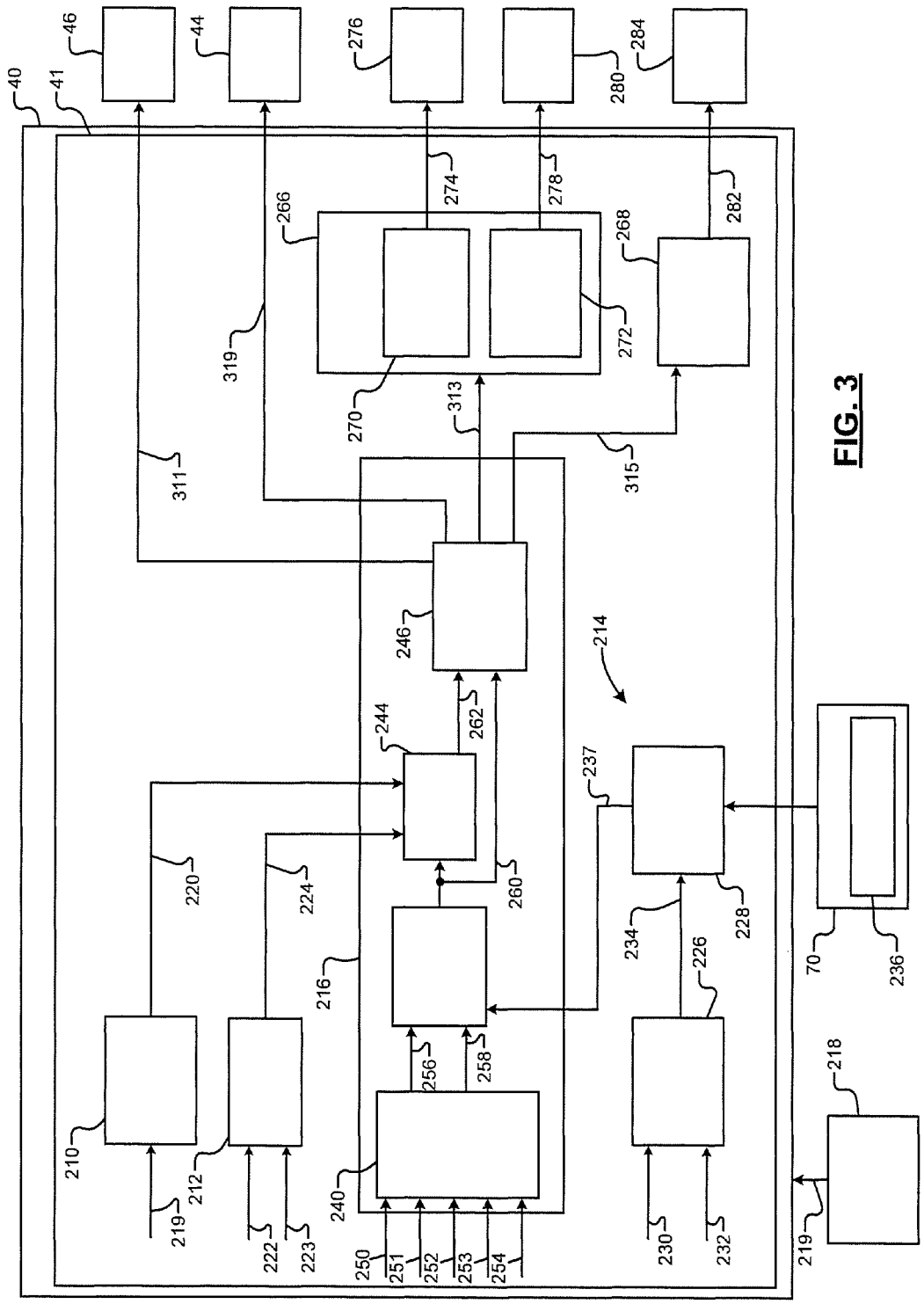
FIG. 3 is a functional block diagram of an engine control module incorporating a thermal control module in accordance with the present disclosure.

Referring now also to FIG. 3, the ECM 40 including the thermal control module 41 is shown. The thermal control module 41 includes a transmission monitoring module 210, a cold start module 212, a fuel type circuit 214 and a catalyst temperature control module 216. The transmission monitoring module 210 monitors state (e.g., reverse (R), neutral (N), drive gear (D1, D2) of a transmission 218 connected to the engine 14. The state of the transmission is indicated by a first transmission signal TRANS (219). The transmission monitoring module 210 determines when the transmission 218 is engaged in a reverse gear or a drive gear and indicates this information via a second transmission signal GEAR (220).

The cold start module 212 determines when engine 14 is to be started and has a temperature that is less than a predetermined temperature. The cold start module 212 may determine whether an engine 14 is to be started based on a start request generated by the ECM 40. The start request may be a user and/or a system generated request. The user based start request may be generated based on a key ON event (e.g., rotation of a key cylinder or actuation of a vehicle start switch to a start position). A key ON event may be indicated, for example, by a key signal KEY (222). A system based start request may be generated by, for example, a start/stop system or a hybrid system to start the engine 14. The engine temperature may be determined based on signals from the engine temperature sensors 89 (e.g., engine temperature signal $T_{eng}$ (223). The cold start module 212 generates a cold start signal CS (224) that indicates whether a cold start is to occur.

The fuel type circuit 214 includes a fuel type module 226 and a threshold determining module 228. The fuel type module 226 determines the type(s) of fuel provided to the engine 14. The fuel type(s) may be determined based on a fuel sensor signal $S_{FUEL}$ (230) from the fuel sensor 32 and/or estimated based on an oxygen signal O2 (232) from the oxygen sensor 36. The fuel type module 226 generates a fuel type signal TYPE (234) that indicates the fuel type(s). The threshold determining module 228 determines one or more temperature and active volume thresholds based on the fuel type(s) indicated by the fuel type signal TYPE. The fuel type module 226 may look-up the thresholds in one or more threshold tables 236 stored in the memory 70 and generate a threshold signal $T_{THR}$ (237).

The catalyst temperature control module 216 controls temperature of the EHC 48, the non-EHC 50, the CC FWC 18 and the underfloor FWC 20. The catalyst temperature control module 216 includes a temperature monitoring module 240, a catalyst comparison module 242, a mode selection module 244 and an EHC power module 246. The temperature monitoring module 240 monitors, estimates and/or determines temperatures of the exhaust system 16 including temperatures of the EHC 48, the non-EHC 50, the CC FWC 18 and the underfloor FWC 20.

The temperature monitoring module 240 may determine respective operating and/or average temperatures and/or active volumes of the EHC 48, the non-EHC 50, the CC FWC 18 and/or the underfloor FWC 20. The temperature of the EHC 48 may be estimated based on current, voltage and/or power provided to the EHC 48. The temperatures of the EHC 48, the non-EHC 50, the CC FWC 18 and/or the underfloor FWC 20 may be determined based on signals T1-T5 (250-254) from the sensors 200-208, an algorithm and/or system models stored in the memory 70. The temperature monitoring module 240 generates a catalyst temperature signal $T_C$ (256) and an active volume signal AV (258) that indicates the respective temperatures and active volumes. The active volumes refer to the volumes of the EHC 48, the non-EHC 50, the CC FWC 18 and/or the underfloor FWC 20 that are active (i.e. have temperatures greater than a methane converting temperature).

As an example, the temperature monitoring module 240 may estimate the temperature and/or the active volume of the CC FWC 18 using a first thermal model and based on engine parameters and/or exhaust temperatures, some of which are described below with respect to equations 1 and 2. The first thermal model may include equations, such as equations 1 and 2.

$$T_C = f\begin{Bmatrix} F_{CCRate}, S_{ENG}, CC_{Mass}, CC_{IMP}, T_{EXH}, DC, \\ E_{RunTime}, E_{Load}, T_{AMB}, CAM, SPK \end{Bmatrix} \quad (1)$$

$$AV = f\begin{Bmatrix} T_C, F_{CCRate}, S_{ENG}, CC_{Mass}, CC_{IMP}, T_{EXH}, DC, \\ E_{RunTime}, E_{Load}, T_{AMB}, CAM, SPK \end{Bmatrix} \quad (2)$$

$F_{CCRate}$ is exhaust flow rate through the CC FWC 18, which may be a function of mass air flow and fuel quantity supplied to the cylinders 28. The mass air flow may be determined by a mass air flow sensor, such as the intake air flow sensor 92. $S_{ENG}$ is speed of the engine 14 (i.e. rotational speed of a crankshaft of the engine 14). DC is duty cycle of the engine 14. $CC_{Mass}$ is mass of the CC FWC 18. $CC_{IMP}$ is resistance or impedance of the CC FWC 18. $E_{RunTime}$ is time that the engine 14 is activated (ON). $E_{Load}$ is current load on the engine 14. $T_{EXH}$ may refer to a temperature of the exhaust system 16, and be based on one or more of the sensors 200-208. $T_{amb}$ is ambient temperature. CAM is cam phasing of the engine 14. SPK is spark timing. The temperature and/or active volume of the CC FWC 18 may be based on one or more of the engine system parameters provided in equations 1 and 2 and/or other engine system parameters. Similar equations may be used to determine the temperatures and active volumes of the EHC 48, the non-EHC 50 and/or the underfloor FWC 20.

The catalyst comparison module 242 determines whether the EHC 48, the non-EHC 50, the CC FWC 18 and/or the underfloor FWC 20 are active for methane based on the threshold signal $T_{THR}$. The catalyst comparison module 242 may compare the temperature(s) indicated by the temperature signal $T_C$ to a temperature threshold indicated by the threshold signal $T_{THR}$. The catalyst comparison module 242 may also or alternatively compare the active volume(s) indicated by the active volume signal AV to active volume thresholds indicated by the threshold signal $T_{THR}$.

The catalyst comparison module 242 generates a comparison signal C1 (260) that indicates whether the temperature(s) indicated by the temperature signal $T_C$ are greater than respective temperature thresholds and/or whether the active volumes indicated by the active volume signal AV are greater than the respective active volumes thresholds. In one implementation and as an example, the catalyst comparison module 242 determines whether a temperature of the EHC 48 is greater than a predetermined temperature threshold for converting methane.

The mode selection module 244 determines the operating mode of the engine system 10, the thermal management system 12 and/or the exhaust system 16. The mode may be selected based on the second transmission signal GEAR, the cold start signal CS, and/or the comparison signal C1. The mode is indicated via a mode signal MODE (262) and may be one of the temperature maintaining mode, the preheat mode, the catalyst heating mode and the normal operating mode.

The EHC power module 246 adjusts and/or maintains temperatures of the exhaust system 16 based on the comparison signal C1 and the mode signal MODE. The EHC power module 246 generates various signals, which are described below with respect to FIG. 4.

The ECM 40 and/or the thermal control module 41 may further include an air/fuel ratio control module 266 and a spark control module 268. The air/fuel ratio control module 266 includes an air control module 270 and a fuel control module 272. The air control module 270 controls air flow to the cylinders 28. The fuel control module 272 controls fuel to the cylinders 28. The spark control module 268 controls spark timing of the cylinders 28. The modules 266, 268, 270, 272 may operate based on the various signals generated by the EHC power module 246.

The air control module 270 generates an air control signal THR (274), which may be provided to a throttle actuator module 276 to control a position of a throttle plate and adjust the amount of air supplied to the cylinders 28. Each system that varies an engine parameter may be referred to as an actuator that receives an actuator value. For example, the throttle actuator module 276 may be referred to as an actuator and the throttle opening area may be referred to as the actuator value. The throttle actuator module 276 may achieve a throttle opening area by adjusting an angle of a blade of a throttle valve. The throttle actuator module 276 may monitor the position of the throttle valve using one or more throttle position sensors (not shown). The air control module 270 may output a desired area signal to the throttle actuator module 276. The throttle actuator module 276 then regulates the throttle valve to produce the desired throttle area.

The fuel control module 272 generates a fuel control signal FUEL (278), which may be provided to a fuel actuator module 280 to adjust the amount of fuel supplied to the cylinders 28. The fuel actuator module 280 may control operation of the fuel injectors 30. The spark control module 268 may generate a spark control (or timing) signal SPARK (282), which may be provided to a spark actuator module 284. The spark actuator module 284 may be referred to as an actuator, while a corresponding actuator value may be, for example, the amount of spark retard relative to cylinder TDC or a current spark time of a cylinder. The spark actuator module 284 controls operation of the spark plugs 32.

Figure 4:
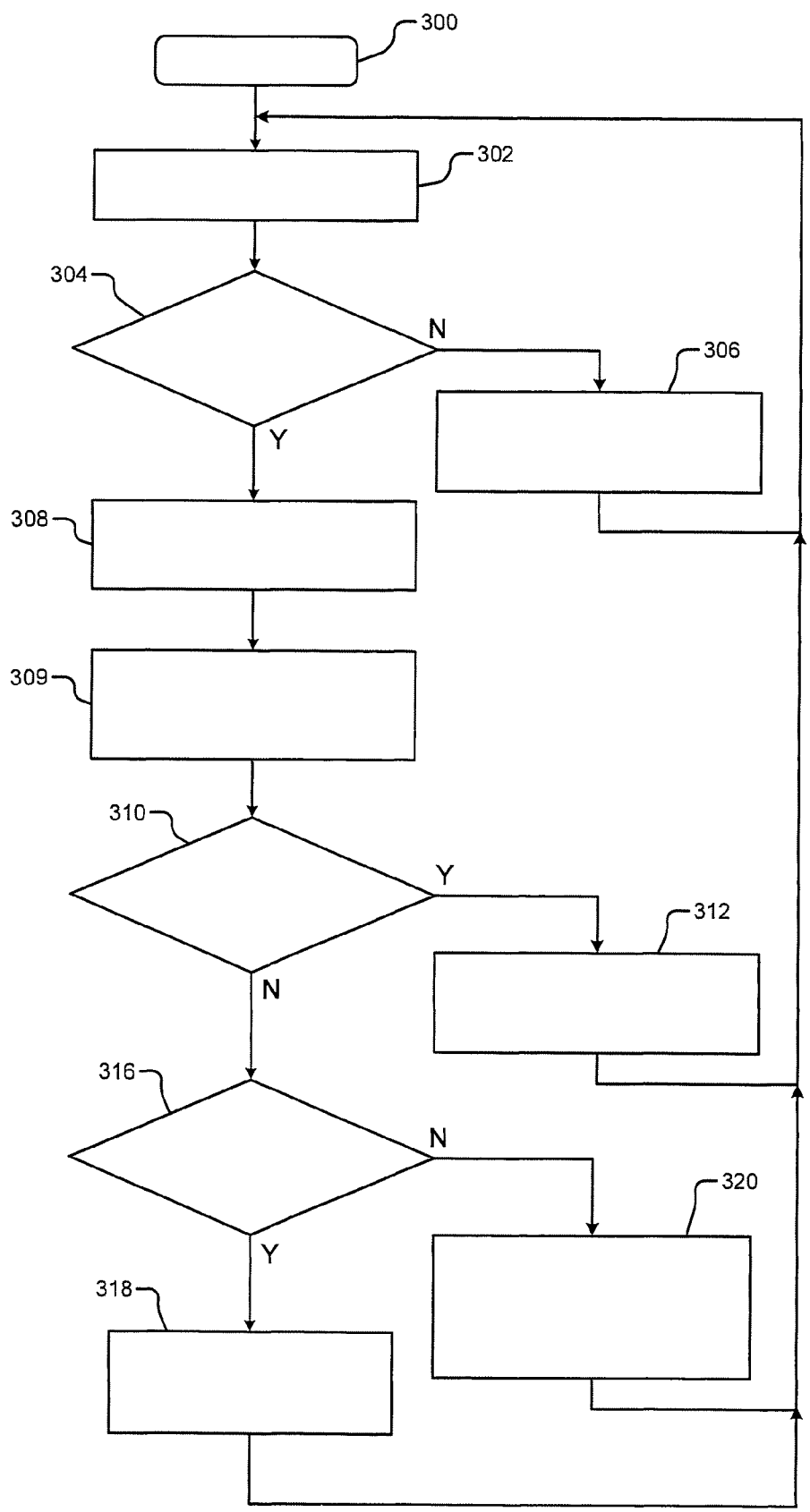
FIG. 4 is a logic flow diagram of a thermal control method in accordance with the present disclosure.

Operation of the modules of FIG. 3 are further described with respect to the method of FIG. 4. The thermal management system 12 may be operated using numerous methods, an example method is provided by the method of FIG. 4. In FIG. 4, a thermal control method is shown. Although the following tasks are primarily described with respect to the implementations of FIGS. 1-3, the tasks may be easily modified to apply to other implementations of the present disclosure. The tasks may be iteratively performed. The method may begin at 300.

At 302, sensor signals are generated. For example, the sensors (fuel sensor, oxygen sensor) 32, 36, 180 and 200-208 may generate respective sensor signals.

At 304, the cold start module 212 determines whether a cold start is to occur as described above. The cold start module 212 may generate the cold start signal CS based on one or more of the sensor signals generated at 302. Task 306 is performed and the mode selection module 244 generates the mode signal MODE to indicate operation in the normal operating mode when a cold start is not to occur. Task 308 is performed when a cold start is to occur. A cold start may not be performed, for example, when: the engine 14 is activated (i.e. ON or fuel and spark are enabled and engine speed is greater than 0); the temperature of the engine 14 is greater than a predetermined temperature; a key ON request has been generated; the catalyst heating circuit 44 is deactivated, temperatures of the exhaust system 16 are greater than respective methane converting temperatures; and/or active volumes of the exhaust system 16 are greater than respective predetermined conversion thresholds.

At 306, the engine system 10, the thermal management system 12, and the exhaust system 16 are operated in the normal operating mode. The catalyst heating circuit 44 is deactivated. The thermal control module 41 may return to task 302 while operating in the normal operating mode.

At 308, the fuel type module 226 determines the fuel type(s) and generates the fuel type signal TYPE. At 309, the threshold determining module 228 determines the temperature thresholds and/or active volume thresholds based on the fuel type(s).

At 310, the transmission monitoring module 210 determines whether the transmission 218 is in a reverse or drive gear. The transmission monitoring module 210 generates the second transmission signal GEAR to indicate this information. Task 312 is performed and the mode selection module 244 generates the mode signal MODE to indicate operating in the catalyst heating mode when the second transmission signal GEAR indicates that the transmission 218 is in a reverse or drive gear. Task 316 is performed when the transmission 218 is not in a reverse or drive gear (e.g., in a neutral position).

At 312, the engine 14 is started and the EHC power module 246 generates signals to increase temperature of the CC FWC 18 and underfloor FWC 20. The signals may be generated based on the fuel type(s) and/or the thresholds determined at 308 and 309. The catalyst temperature control module 216 and/or the EHC power module 246 may generate an air pump signal AIR (311), an air/fuel request signal RICH (313), and/or a spark request signal RET (315) to increase air flow into the exhaust system 16, decrease an air/fuel ratio of the engine 14 and/or to retard spark of the engine. The air/fuel request signal RICH may be generated to provide a richer air/fuel ratio than a current air/fuel ratio and/or to provide a rich air/fuel ratio. A rich air/fuel ratio may refer to an air/fuel ratio that is less than a stoichiometric air/fuel ratio (e.g., 14.7:1). Rich engine operation increases engine operating temperatures, which increases temperature of the catalysts.

The air pump signal AIR may be provided to the air pump 46. The air/fuel request signal RICH may be provided to the air/fuel ratio control module 266. The air control signal THR and the fuel control signal FUEL may be generated based on the air/fuel request signal RICH. The spark request signal RET may be provided to the spark control module 268. The spark control signal SPARK may be generated based on the spark request signal RET. The thermal control module 41 may return to task 302 while operating in the catalyst heating mode.

At 316, the comparison module 242 determines whether the temperature(s) indicated by the temperature signal $T_C$ are less than the temperature thresholds indicated by the threshold signal $T_{THR}$. The comparison module 242 may also or alternatively determine whether the active volume(s) indicated by the active volume signal AV is less than the respective active volume thresholds indicated by the threshold signal $T_{THR}$. Task 318 may be performed when one or more of the temperature(s) is less than the temperature thresholds and/or one or more of the active volume(s) is less than the respective active volume thresholds.

In one implementation, the comparison module 242 determines whether the temperature $T_{EHC}$ of the EHC 48 is less than a predetermined threshold $T_{MET}$ for methane conversion. Task 318 is performed when the temperature $T_{EHC}$ is less than the predetermined threshold $T_{MET}$, otherwise task 320 is performed. This is shown by decision block 316. As an example, the predetermined threshold $T_{MET}$ may be set higher when an alcohol-based fuel (such as methanol or ethanol) is combusted than when gasoline is combusted. To effectively bypass preheating and/or increasing temperature of the EHC 48 prior to starting the engine 14, the predetermined threshold $T_{MET}$ may be set at an ambient temperature, as indicated by the ambient temperature sensor 187. This may be done, for example, when gasoline is combusted.

The mode selection module 244 generates the mode signal MODE indicating operation in the preheat mode when task 318 is performed. The mode selection module 244 generates the mode signal MODE indicating operation in the temperature maintaining mode when task 320 is performed.

At 318, the preheat mode is executed including preheating one or more of the EHC 48, the non-EHC 50, the CC FWC 18 and the underfloor FWC 20. In one implementation, the EHC 48 is heated via the catalyst heating circuit 44. The catalyst heating circuit 44 may be activated and current, voltage and/or power of the catalyst heating circuit 44 may be set based on the fuel type(s) and/or the thresholds determined at 308 and 309.

The EHC power module 246 generates a power signal POWER (319) based on the fuel type(s) and/or the thresholds indicated by the threshold signal $T_{THR}$. The power signal POWER may be provided to the catalyst heating circuit 44 to control heating of the EHC 48. As an example, more power may be provided to the catalyst heating circuit 44 when E85 fuel is combusted, as opposed to gasoline. The engine is deactivated during the preheat mode. The thermal control module 41 may return to task 302 while operating in the preheat mode.

At 320, the temperature maintaining mode is executed to maintain temperatures of the EHC 48, the non-EHC 50, the CC FWC 18 and/or the underfloor FWC 20. This may include adjusting current, voltage and/or power of the catalyst heating circuit 44 to maintain a temperature of the EHC 48. Operation of the catalyst heating circuit 44 is adjusted based on the fuel type(s) and/or thresholds determined at 308 and 309. The EHC power module 246 generates and/or adjusts the power signal POWER to the catalyst heating circuit 44 based on the fuel type(s) and/or the thresholds. In one implementation the temperature of the EHC 48 is maintained at a temperature greater than or equal to a predetermined temperature for converting methane. The thermal control module 41 may return to task 302 while operating in the temperature maintaining mode.

The above-described tasks are meant to be illustrative examples; the tasks may be performed sequentially, synchronously, simultaneously, continuously, during overlapping time periods or in a different order depending upon the application. Also, the numerical designations of the above tasks are not necessarily in the order that the tasks are performed. For example, task 310 may be performed subsequent to task 318 and/or task 320 to further increase temperatures of the EHC, non-EHC, CC FWC 18 and/or underfloor FWC 20. Task 320 may be performed subsequent to task 318 to maintain temperatures of the EHC, non-EHC, CC FWC 18 and/or underfloor FWC 20. Tasks 312-320 may be performed prior to performing a cold start of the engine 12.

The EHC power module 246 may adjust and/or increase power to the catalyst heating circuit 44 (e.g., at tasks 318 and 320) subsequent to the ECM 40 shutting down the engine 14 and prior to the ECM 40 restarting the engine 14. This may occur when the engine system 10 is a start-stop system. The EHC power module 246 may adjust and/or increase power to the catalyst heating circuit 44 when the engine 14 is OFF and the start-stop system is ON. The start-stop system may be ON subsequent to a key ON event and/or when a key cylinder and/or a vehicle start switch is in an ON position.

The above-described implementations improve emissions reduction of a start/stop engine system including reduction in methane emissions. By accounting for fuel type used when preheating catalysts of an exhaust system, the implementations limit impact on battery life. Current supplied by a battery to a heating circuit and/or an air pump is adjusted according to fuel type. A catalyst may be heated quicker when an engine is OFF then during a cold start. Exhaust from the engine is directed across a catalyst during a cold start, which can decrease temperature of the catalyst. For this reason, less power is consumed by preheating the catalyst prior to starting the engine.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A start-stop system comprising:
 a fuel type module that determines a fuel type of a fuel supplied to an engine;
 a threshold module that determines a first threshold based on the fuel type;
 a temperature module that estimates a temperature of a catalyst of an exhaust system of the engine;
 a comparison module that compares the temperature to the first threshold and generates a comparison signal;
 a power module that adjusts power to a heating circuit based on the comparison signal, wherein the heating circuit is configured to increase the temperature of the catalyst, and wherein the power module adjusts the power to the heating circuit to increase the temperature of the catalyst when the engine is shut down; and
 an engine control module that shuts down and restarts the engine to reduce idling time of the engine.

2. The start-stop system of claim 1, wherein:
 the power module increases the power to the heating circuit subsequent to the engine control module shutting down the engine and prior to the engine control module restarting the engine; and
 the power module increases the power to the heating circuit when the engine is OFF and the start-stop system is ON.

3. The start-stop system of claim 2, wherein the power module increases the power to the heating circuit in response to a key ON request.

4. The start-stop system of claim 1, wherein the power module:
 preheats the catalyst prior to startup of the engine to at least the first threshold when a first fuel is combusted; and
 preheats the catalyst prior to startup of the engine to at least a second threshold when a second fuel is combusted.

5. The start-stop system of claim 4, wherein the power module sets the second threshold based on an ambient temperature.

6. The start-stop system of claim 1, further comprising a transmission monitoring module that generates a transmission signal based on whether a transmission is in one of a reverse gear and a drive gear,
 wherein the power module preheats the catalyst prior to startup of the engine based on the transmission signal.

7. The start-stop system of claim 1, further comprising a cold start module that generates a cold start signal based on whether the engine is to be started and whether a temperature of the engine is less than a predetermined temperature,
 wherein the power module preheats the catalyst prior to startup of the engine based on the cold start signal.

8. The start-stop system of claim 1, wherein the fuel type module estimates the fuel type based on at least one of a fuel signal from a fuel sensor and an oxygen signal from an oxygen sensor.

9. The start-stop system of claim 1, further comprising:
a transmission monitoring module that generates a transmission signal based on whether a transmission is in one of a reverse gear and a drive gear; and
a catalyst temperature control module that adjusts the temperature of the catalyst by generating an air and fuel ratio request signal to operate the engine with a rich air and fuel ratio based on the transmission signal.

10. The start-stop system of claim 9, wherein the catalyst temperature control module increases the temperature of the catalyst by generating the air and fuel ratio request signal when the transmission is in one of the reverse gear and the drive gear.

11. The start-stop system of claim 9, wherein the catalyst temperature control module generates at least one of a spark request signal and an air pump signal based on the transmission signal to increase the temperature of the catalyst.

12. A thermal control method comprising:
determining a fuel type of a fuel supplied to an engine of a start-stop system;
determining a first threshold based on the fuel type;
estimating a temperature of a catalyst of an exhaust system of the engine;
generating a comparison signal based on a comparison between the temperature and the first threshold;
adjusting power to a heating circuit to increase the temperature of the catalyst based on the comparison signal and when the engine is shut down, wherein the heating circuit is configured to increase the temperature of the catalyst; and
shutting down and restarting the engine to reduce idling time of the engine.

13. The thermal control method of claim 12, further comprising:
increasing the power to the heating circuit subsequent to the shutting down of the engine and prior to the restarting of the engine; and
increasing the power to the heating circuit when the engine is OFF and the start-stop system is ON.

14. The thermal control method of claim 13, wherein the power to the heating circuit is increased in response to a key ON request.

15. The thermal control method of claim 12, further comprising:
preheating the catalyst prior to startup of the engine to at least the first threshold when a first fuel is combusted; and
preheating the catalyst prior to startup of the engine to at least a second threshold when a second fuel is combusted.

16. The thermal control method of claim 15, further comprising setting the second threshold based on an ambient temperature.

17. The thermal control method of claim 12, further comprising:
generating a transmission signal based on whether a transmission is in one of a reverse gear and a drive gear; and
preheating the catalyst prior to startup of the engine based on the transmission signal.

18. The thermal control method of claim 12, further comprising:
generating a cold start signal based on whether the engine is to be started and whether a temperature of the engine is less than a predetermined temperature; and
preheating the catalyst prior to startup of the engine based on the cold start signal.

19. The thermal control method of claim 12, wherein the fuel type is estimated based on at least one of a fuel signal from a fuel sensor and an oxygen signal from an oxygen sensor.

20. The thermal control method of claim 12, further comprising:
generating a transmission signal based on whether a transmission is in one of a reverse gear and a drive gear; and
adjusting the temperature of the catalyst by generating an air and fuel ratio request signal and at least one of a spark request signal and an air pump signal to operate the engine with a rich air and fuel ratio based on the transmission signal,
wherein the temperature of the catalyst is increased by generating the air and fuel ratio request signal and the at least one of the spark request signal and the air pump signal when the transmission is in one of the reverse gear and the drive gear.

* * * * *